(12) United States Patent
Essig et al.

(10) Patent No.: US 11,576,303 B2
(45) Date of Patent: Feb. 14, 2023

(54) SHEAR BAR

(71) Applicant: Betek GmbH & Co. KG, Aichhalden (DE)

(72) Inventors: Wolfgang Essig, Rosenfeld (DE); Uwe Schneider, Rottweil (DE); Fabian Seifried, Herrenzimmern (DE); Julian Roming, Schramberg (DE)

(73) Assignee: Betek GmbH & Co. KG

( * ) Notice: Subject to any disclaimer, the term of this patent is extended or adjusted under 35 U.S.C. 154(b) by 98 days.

(21) Appl. No.: 16/887,386

(22) Filed: May 29, 2020

(65) Prior Publication Data

US 2020/0396898 A1    Dec. 24, 2020

(30) Foreign Application Priority Data

Jun. 24, 2019    (DE) .................... 10 2019 116 945.3

(51) Int. Cl.
  *A01D 34/52* (2006.01)
  *A01F 29/06* (2006.01)
  (Continued)

(52) U.S. Cl.
  CPC .............. *A01D 34/52* (2013.01); *A01F 29/06* (2013.01); *B02C 18/18* (2013.01); *B02C 2018/188* (2013.01)

(58) Field of Classification Search
  CPC .......... B02C 2018/188; B02C 2018/18; B02C 2018/184; A01D 34/52; A01D 43/08; A01F 29/06; A01F 29/09
  See application file for complete search history.

(56) References Cited

U.S. PATENT DOCUMENTS

| | | | |
|---|---|---|---|
| 5,549,025 A | * | 8/1996 | Muller .................. B02C 18/186 83/694 |
| 5,603,365 A | | 2/1997 | Stewart |

(Continued)

FOREIGN PATENT DOCUMENTS

| | | |
|---|---|---|
| AT | 398509 B | 12/1994 |
| DE | 8700403 U1 | 6/1987 |

(Continued)

OTHER PUBLICATIONS

European Patent Office Search Report for corresponding patent application No. 20177537.6, dated Nov. 23, 2020, 5 pages.

*Primary Examiner* — Adam J Eiseman
*Assistant Examiner* — Mohammed S. Alawadi
(74) *Attorney, Agent, or Firm* — Lucian Wayne Beavers; Patterson Intellectual Property Law, PC

(57) ABSTRACT

The invention relates to a shear bar (20), in particular for a forage harvester or another agricultural or silvicultural machine, having a carrier (21) that comprises a cutting region (30); a plurality of cutting elements (31) being set alongside one another in the cutting region (30); the cutting elements (31) comprising a partial edge and at least some of the partial edges forming a cutting edge (32) that is embodied to form, with a knife bar, a cutting engagement for the material to be shredded; the cutting edge (32) forming a transition between a cutting surface (32.1) that is constituted by the cutting elements (31) and extends transversely to the cutting direction, and an exposed surface (32.2) that extends substantially in a cutting direction and indirectly or directly adjoins the cutting edge (32). A shear bar of this kind can be configured to be break-resistant with little complexity in terms of parts and manufacture if provision is made that an infeed element (34), which is embodied as a sintered part made of hard material having an infeed bevel (34.6) profiled on in the sintering process, is provided on or in the row of (Continued)

cutting elements (31); the infeed bevel (34.6) being carried over indirectly or directly into the cutting edge (32); and the infeed bevel (34.6) being arranged at a tilt with respect to the cutting edge (32) in such a way that it is arranged with a setback with respect to the exposed surface (32.2) and toward the cutting surface (32.1).

17 Claims, 9 Drawing Sheets

(51) Int. Cl.
*B02C 18/18* (2006.01)
*A01D 43/08* (2006.01)
*A01F 29/09* (2010.01)

(56) References Cited

U.S. PATENT DOCUMENTS

| | | | |
|---|---|---|---|
| 5,829,700 A | 11/1998 | Pianca et al. | |
| 6,094,795 A | 8/2000 | Davenport | |
| 7,703,714 B2 | 4/2010 | Becker et al. | |
| 9,144,804 B2 | 9/2015 | Kessler et al. | |
| 9,764,398 B2 | 9/2017 | Tanaka et al. | |
| 9,943,037 B2 | 4/2018 | Stanley et al. | |
| 10,562,035 B2 | 2/2020 | Roth et al. | |
| 2011/0100383 A1 | 5/2011 | Tilley et al. | |
| 2013/0099037 A1 | 4/2013 | Moosmann et al. | |
| 2013/0168477 A1 | 7/2013 | Doppstadt et al. | |
| 2015/0013297 A1 | 1/2015 | Bacon et al. | |
| 2017/0008005 A1 | 1/2017 | Roth et al. | |
| 2017/0020066 A1* | 1/2017 | Lutz | A01F 29/09 |
| 2017/0113227 A1* | 4/2017 | Smeets | B27L 11/005 |

FOREIGN PATENT DOCUMENTS

| | | |
|---|---|---|
| DE | 4402111 A1 | 7/1995 |
| DE | 102010016498 A1 | 10/2011 |
| DE | 102014106037 A1 | 11/2015 |
| DE | 102014108607 A1 | 12/2015 |
| EP | 022053 A1 | 1/1981 |
| EP | 640449 A1 | 3/1995 |
| EP | 761089 A1 | 3/1997 |
| EP | 2842413 A1 | 3/2015 |
| JP | 2010017638 A | 1/2010 |

* cited by examiner

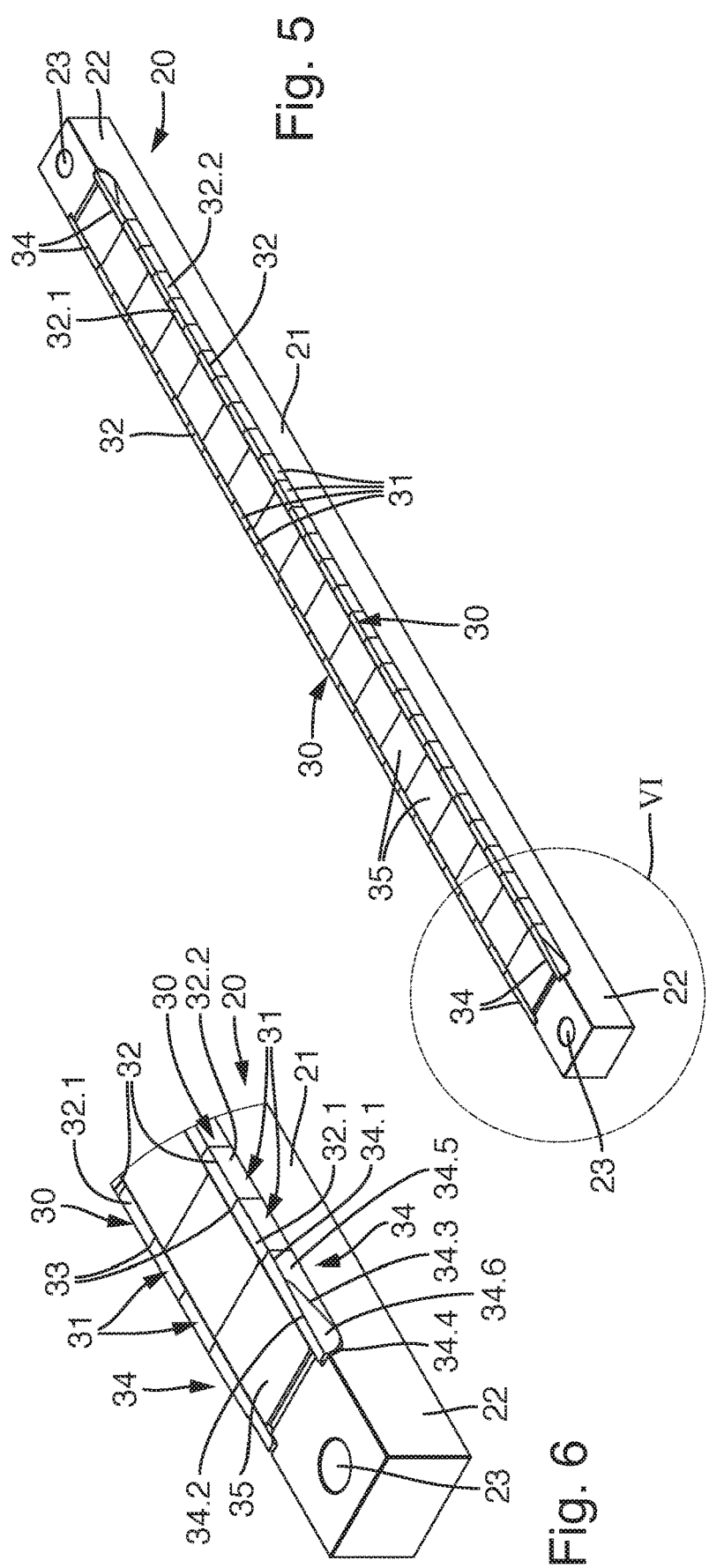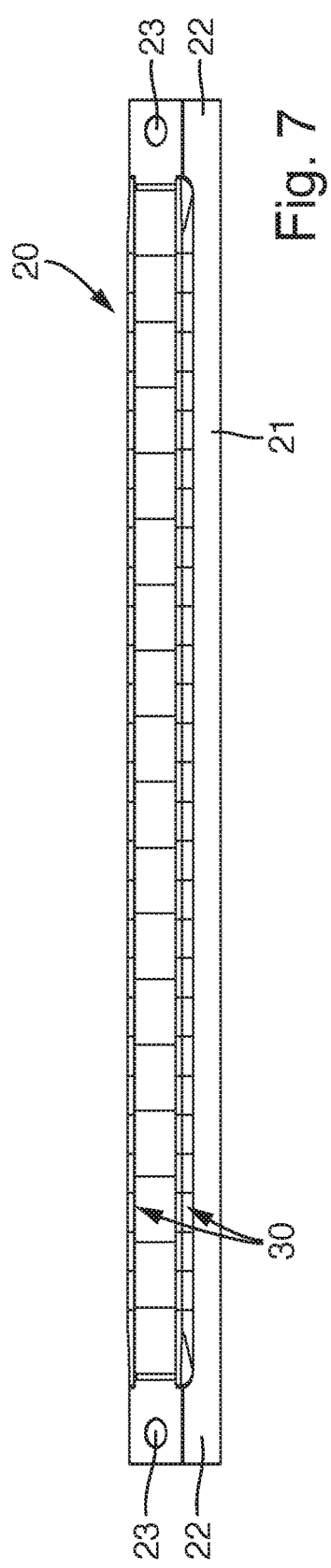

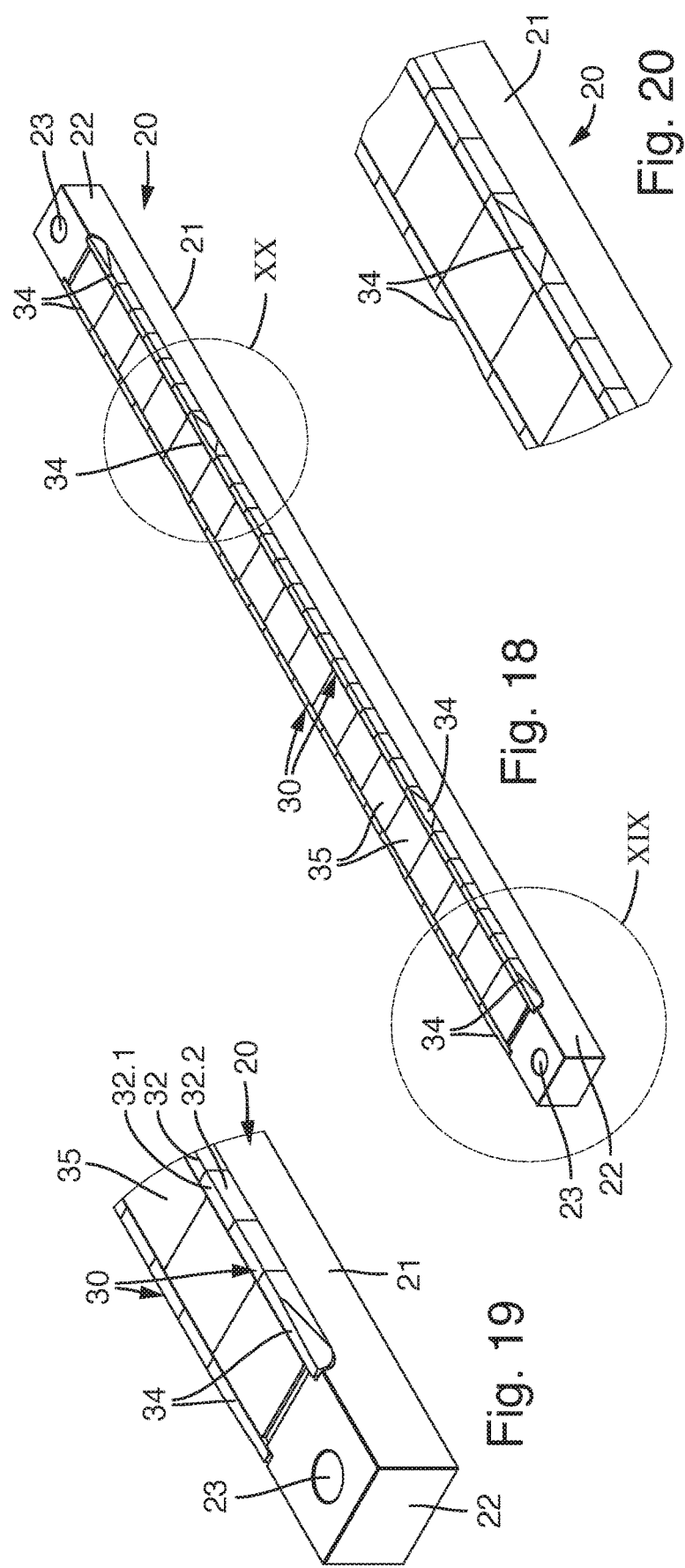

SHEAR BAR

BACKGROUND OF THE INVENTION

1. Field of the Invention

The invention relates to a shear bar, in particular for a forage harvester or another agricultural or silvicultural machine, having a carrier that comprises a cutting region; a plurality of cutting elements being set alongside one another in the cutting region; the cutting elements comprising a partial edge and at least some of the partial edges forming a cutting edge that is embodied to form, with a knife bar, a cutting engagement for the material to be shredded; the cutting edge forming a transition between a cutting surface that is constituted by the cutting elements and extends transversely to the cutting direction, and an exposed surface that extends substantially in a cutting direction and indirectly or directly adjoins the cutting edge.

2. Description of the Prior Art

EP 2 842 413 A1 (US 2015/0132997) discloses a forage harvester that comprises a cutting unit having a chopping drum. Knife bars are fastened on the chopping drum. The knife bars are mounted on the circumference of the chopping drum in such a way that they extend in the direction of the rotation axis of the chopping drum. A stationary shear bar works together with the chopping drum. The knife bars and the shear bar form a common cutting region in which harvested material can be shredded. For this, the harvested material is firstly picked up by a harvested material pickup apparatus of the harvester and compressed in the region of intake rollers. The intake rollers are arranged in a delivery direction directly in front of the shear bar.

In order to achieve good cutting performance, it is necessary to be able to set the cutting gap between the shear bar and the knife bars to be as small as possible. Care must nevertheless be taken that contact of the knife bars against the shear bars is prevented. In the event of such contact, the risk exists of damage to the cutting elements, which are made of a brittle hard material (for example, metal carbide or ceramic). A shear bar damaged in this manner considerably reduces cutting performance, and premature replacement is necessary in order to maintain the desired cutting performance. Setting the shear bar requires know-how and an adjustment apparatus that operates precisely. The possibility of an inexact adjustment of the cutting gap, or of inadvertent shifts in the shear bar in the course of operating time, cannot always be ruled out.

DE 10 2014 106 037 A1 (US 2017/008005) discloses a shear bar that is intended for use in a forage harvester or woodchipper. The shear bar comprises a carrier body that is fitted on oppositely located sides with cutting elements. The cutting elements each have a partial edge. The partial edges form a common cutting edge. When a cutting edge becomes worn, the shear bar can be reinstalled in an arrangement that is rotated 180°, so that the second cutting edge is utilized.

SUMMARY OF THE INVENTION

The object of the invention is to furnish a shear bar of the kind mentioned initially in which, with few parts and little production outlay, edge breakage can be reliably prevented even when the cutting gap is not exactly maintained.

This object is achieved by the fact that an infeed element, which is embodied as a sintered part made of hard material having an infeed bevel profiled on in the sintering process, is provided on or in the row of cutting elements; the infeed bevel being carried over indirectly or directly into the cutting edge; and the infeed bevel being arranged at an angle to the cutting edge in such a way that it is arranged with a setback with respect to the exposed surface and toward the cutting surface.

The infeed element according to the present invention prevents an edge breakage even when the cutting gap is not set exactly. In particular, if the cutting gap is set to be too small, the knife bar can run onto the infeed bevel, arranged with a setback, of the infeed element. Hard contact by the knife bar on the shear bar, if the cutting gap is incorrectly set, is then ruled out in this operating phase. The knife bar slides on the infeed bevel and can be deflected elastically in a radial direction. This is possible, for example, because of the inherent elasticity of the knife bar or by way of an elastic deflection apparatus. Once the knife edge has passed beyond the infeed bevel, the edge of the knife bar travels into the region of the cutting edge of the shear bar, since according to the present invention the infeed bevel is carried over into the cutting edge.

A particular feature of the invention is that the infeed element, which is made of a hard material, for example ceramic or metal carbide, is equipped with the infeed bevel already profiled on in the sintering process. In other words, during the manufacturing process the infeed element is firstly compressed, along with the infeed bevel, as a green compact. The green compact is then fired in the sintering oven. The infeed element is then immediately usable and can be installed on the shear bar, for example soldered or adhesively bonded. A laborious grinding process, in which the infeed bevel is ground, can thereby be omitted. In particular, not only is this step cost-intensive, but heat energy would be introduced into the previously manufactured shear bar via the infeed element by means of the grinding process, and into the join between the infeed element and the support member of the shear bar. The structure of the joining material (solder join, adhesive join, etc.) is thereby changed, with the result that strength can be disadvantageously impaired.

Particularly preferably, provision is made that the depth of the pressed-in infeed bevel perpendicularly to the exposed surface of the adjacent cutting element is in the range between 0.8 and 1.3 mm. Such a depth optimally takes into account misalignments that usually occur during operation, in particular changes in the position of the knife edges which occur during operational use.

According to a preferred variant of the invention, provision can be made that the infeed element comprises an edge portion having an infeed-element cutting edge, said infeed-element cutting edge transitioning into the cutting edge constituted by the cutting elements, in particular being in alignment with that cutting edge. With such a design, the infeed bevel directly on the infeed element can already be carried over into the infeed-element cutting edge formed there. This can be achieved in simple fashion and with high dimensional stability with the selected manufacturing method using a sintering process. The knife bar can accordingly run onto the infeed bevel and be transferred into the infeed-element cutting edge. The knife edge is then in a position in which it can no longer damage the adjacent cutting edge.

If provision is made that the infeed element comprises a cover portion that transitions flush into the cutting surface constituted by the adjacent cutting element, a stepless transition is then created which enables good and low-wear carryover of the knife edge into the region of the cutting edge.

Provision can also be made for that purpose, additionally or alternatively, that the infeed element comprises a front-side exposed infeed-element surface that transitions flush into the exposed surface constituted by the adjacent cutting element.

According to a conceivable variant of the invention, provision can be made that the infeed bevel of the infeed element is delimited on oppositely located sides by an edge and by a transition region; the edge transitioning into an upper-side cover portion and the transition portion carrying the infeed bevel over into the exposed infeed-element surface. As a result of this simple feature, the infeed bevel becomes set with a tilt with respect to the cutting edge such that the knife edge that runs on cannot make direct contact with either the cover portion or the exposed surface if the cutting gap is not exactly maintained.

Provision can also be made for that purpose that the infeed element comprises a longitudinal center plane that extends in the direction of the cutting edge and of a transverse center plane perpendicular thereto and that also extends in the direction of the cutting edge; that the infeed bevel or bevels are at an angle both to the longitudinal center plane and to the transverse center plane; or that the infeed bevel or bevels are at an angle to the longitudinal center plane.

According to a conceivable variant of the invention, provision can be made that the infeed element comprises an abutment face at its one longitudinal-side end in the transition region to the adjoining cutting element, and comprises an end portion at the oppositely located longitudinal-side end; and that a second carryover region, which adjoins the infeed bevel in flat fashion and at an angle and/or in a curved shape, is provided in the region of the end portion adjacently to the infeed bevel. By way of the abutment face the infeed element can adjoin, preferably with zero clearance, the adjoining cutting element of the row of cutting elements. The transition region between the infeed element and the adjacent cutting element can thereby be protected from abrasive attack, which results in an extended service life. The knife edge running onto the infeed element can furthermore be carried over directly and gently into the cutting element. In addition, the second carryover region that is provided on the end portion can also be embodied for that purpose in suitable fashion.

A simple and stable configuration for the infeed element is produced when provision is made that the infeed element is delimited on its upper side by a cover portion and on its lower side by a bottom, the cover portion preferably being parallel to the bottom; that the infeed element is delimited at the front by the exposed infeed-element surface; and that the exposed infeed-element surface adjoins the cover portion and/or the bottom.

A variety of types of shear bars can be designed using the infeed element according to the present invention. For example, provision can be made that an infeed element is provided at one longitudinal-side end of the row of cutting elements. A configuration of this kind is useful, for example, if the knife edges of the chopping drum extend over the entire cutting width of the chopping drum, the knife edges being set at an angle of less than 90° with respect to the circulation direction (cutting direction) of the cutting drum.

In the context of a design in which knife edges are mounted circumferentially on the chopping drum at the oppositely located longitudinal-side ends of the chopping drum, those knife edges each proceeding at an angle of less than 90° with respect to the circumferential direction and the knife edges of the oppositely located sides being set at an angle to one another, provision can preferably be made that an infeed element is arranged at the two longitudinal-side ends of the row of cutting elements. The knife edges on the respectively oppositely located ends of the chopping drum can then run onto the infeed element associated with it.

Also conceivable is a design in which the shear bar is configured in such a way that at least one infeed element is integrated into the row of cutting elements between two adjacent cutting elements. This configuration is suitable when, for example, in addition to circumferentially proceeding rows of knife edges that are provided at the two oppositely located ends of the chopping drum, one or several additional rows of cutting elements are also used circumferentially, centeredly on the chopping drum between the two ends.

Such a use is also conceivable in the context of a chopping drum in which two rows of knife edges proceed in a circumferential direction, those knife edges of the rows meeting in a center region of the chopping drum and being set in a V-shape with respect to one another.

With such chopping drums, the infeed element can preferably comprise two infeed bevels that are at an angle to one another and to the cutting edge; and the infeed bevels can transition into one another directly or via a joining portion. The two rows of knife edges can run onto the same infeed element, the knife edges of the one row running onto the first infeed bevel, and the knife edges of the second row onto the second infeed bevel. Parts complexity can thereby be further decreased.

In the interest of a stable and simple design for the infeed element, provision can furthermore be made in this context that the joining portion terminates with a joining edge in the region of the cover portion, the joining edge constituting a transition between the joining portion and the cover portion. In a refinement of the invention, the joining portion can comprise a flat surface portion or a concavely curved surface portion between the two infeed bevels. With a concave curvature, the joining portion can offer a harmonious carryover into the two infeed bevels. A stress-optimized design is also thereby made possible.

If provision is made that the carrier comprises, on oppositely located sides, rows of cutting elements that each form a cutting edge; and that each of the rows of cutting elements comprises at least one infeed element, the shear bar can then be installed in such a way that one of the two cutting edges comes selectably into cutting engagement with the chopping drum. In particular, when a cutting edge is worn out, the shear bar can easily be rotated and the second cutting edge can be brought into cutting engagement. This results in an extension of service life and a decrease in parts complexity, since only one carrier needs to be utilized for two cutting edges.

In order to allow that region of the carrier which adjoins the cutting elements also to be effectively protected from wear, provision can be made that the row of cutting elements is adjoined in the region of the upper side of the carrier by a row of armor elements that are preferably constituted by plate-shaped elements made of hard material, in particular metal carbide.

BRIEF DESCRIPTION OF THE DRAWINGS

The invention will be explained in further detail below with reference to exemplifying embodiments depicted in the drawings, in which:

FIG. 5 is a perspective depiction of a shear bar;

FIG. 6 shows a detail that is taken from FIG. 5 and labeled VI therein;

FIG. 7 shows the shear bar of FIG. 6 in a modified perspective;

FIG. 18 is a perspective depiction of a further exemplifying embodiment of a shear bar;

FIG. 19 shows a detail taken from FIG. 18 and labeled XIX in that illustration;

FIG. 20 shows a detail taken from FIG. 18 and labeled XX in that illustration;

FIG. 21 shows the shear bar according to FIG. 18 in a modified perspective;

DETAILED DESCRIPTION

Figure 1:
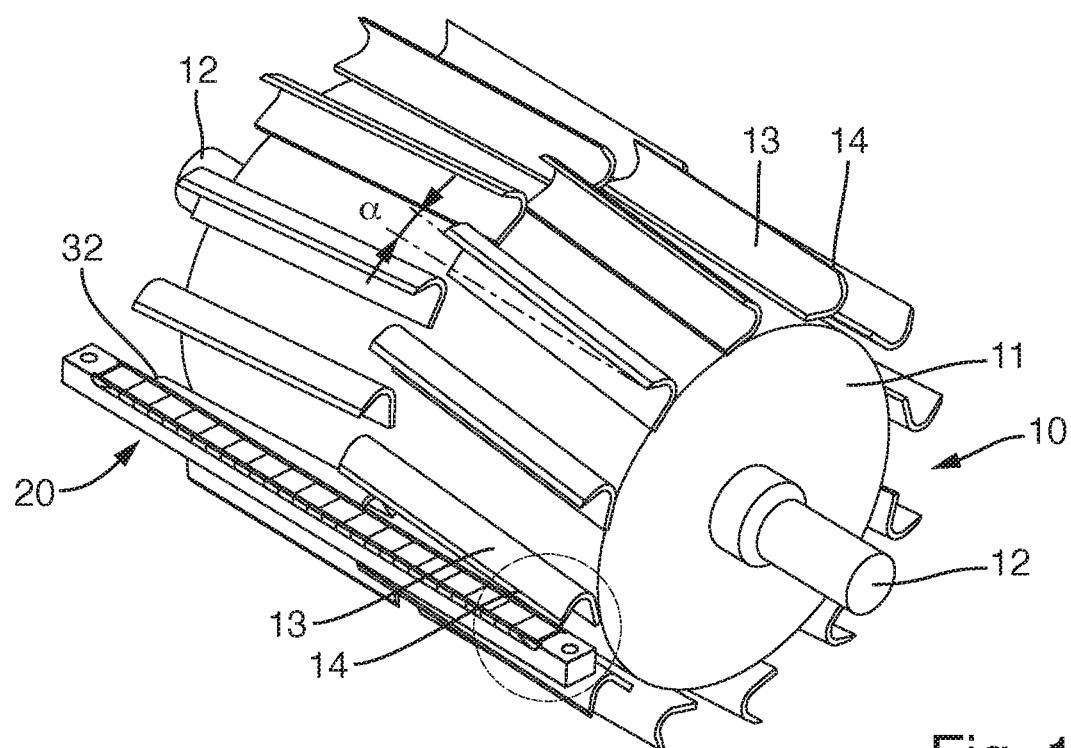
FIGS. 1 and 2 are various perspective depictions of a chopping drum.

FIG. 1 shows a chopping drum 10 that comprises a roller-shaped cutting body 11. Knife bars 13 are arranged on the outer circumference of cutting body 11. Knife bars 13 each have an edge 14. Knife bars 13 are mounted on the outer circumference of cutting body 11 in such a way that they are set at a cutting angle α. Cutting angle α is formed between edge 14 and an axial line proceeding parallel to the rotation axis of chopping drum 10.

As is evident from the drawing, two rows of knife bars 13 are provided, proceeding in a circumferential direction of chopping drum 10. The arrangement of knife bars 13 is such that knife bars 13 of the one row of knife bars 13 are set in a V-shape with respect to the other row of knife bars 13. Identical cutting angles α are provided in each case. Cutting body 11 comprises, at its two longitudinal-side ends, bearing shafts 12 with which it can be held rotatably on a cutting unit.

Figure 2:
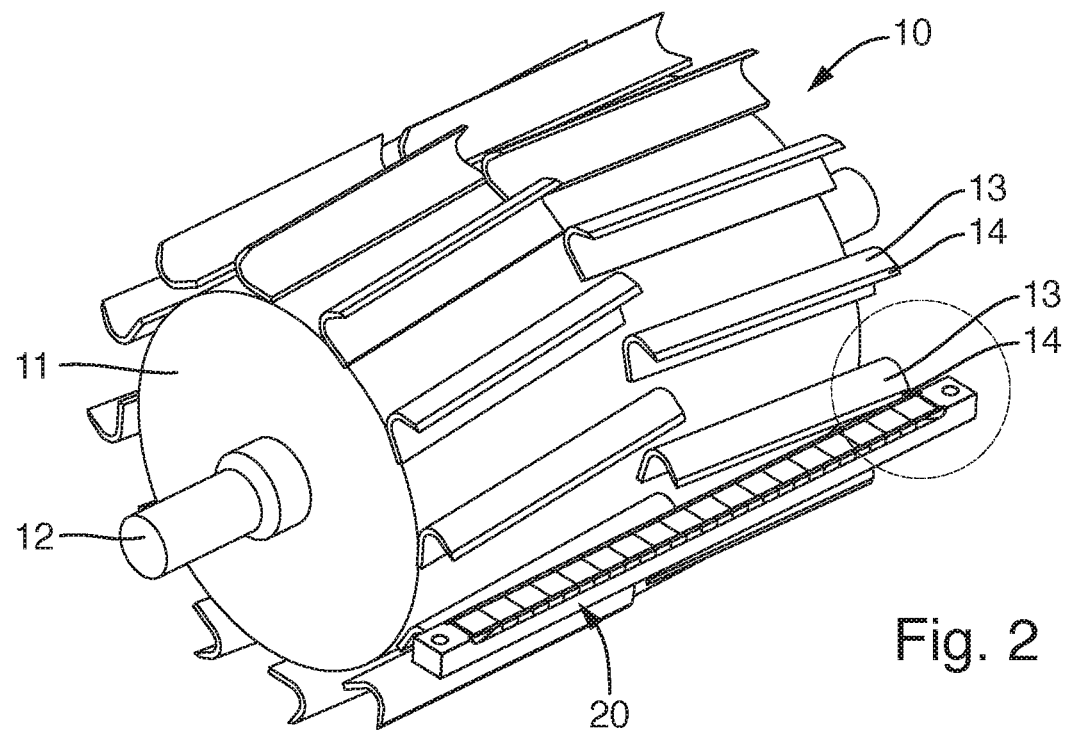

It is further evident from FIGS. 1 and 2 that a shear bar 20 is provided. Shear bar 20 forms a cutting edge 32. Chopping drum 10 is associated with shear bar 20 in such a way that upon a rotational motion of chopping drum 10, knife blades 13 can be guided with their edges 14 past cutting edge 32 with a small spacing. This is illustrated in more detail in FIGS. 3 and 4.

Figure 3:
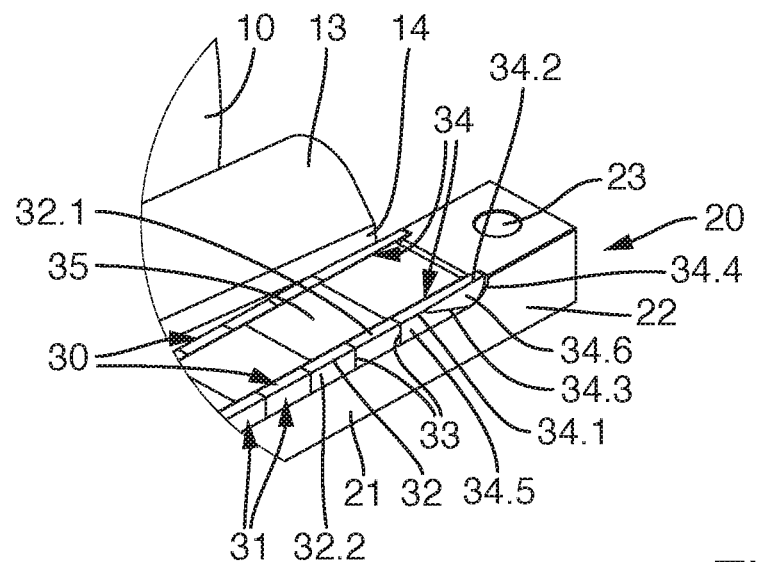
FIGS. 3 and 4 are enlarged depictions of details taken from FIGS. 1 and 2.
Figure 4:
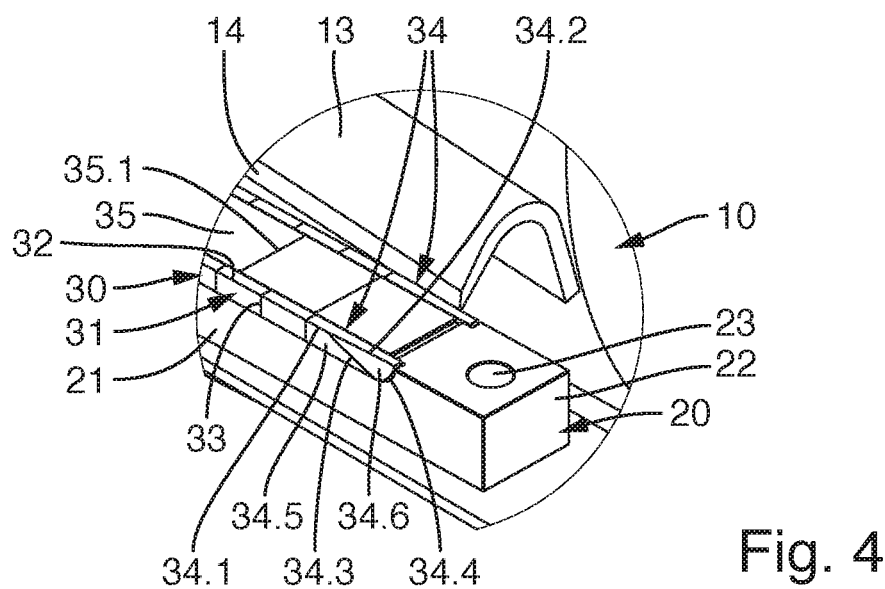

FIGS. 3 and 4 shows details taken from FIGS. 1 and 2. As is evident from those illustrations, shear bar 20 comprises a carrier 21. This carrier 21 is constituted from a steel material. Carrier 21 comprises end pieces 22 at both of its longitudinal-side ends. End pieces 22 are equipped with fastening receptacles 23, for example fastening orifices; shear bar 20 can be releasably fastened, with fastening receptacles 23, in the region of the cutting unit.

As is evident from FIG. 3, shear bar 20 possesses two cutting regions 30. Cutting regions 30 are provided on the oppositely located longitudinal sides of carrier 21.

One row of cutting elements 31 is provided in each cutting region 30. Cutting elements 31 are constituted by hard-material elements, for example elements made of metal carbide or ceramic. Cutting elements 31 have substantially a cuboidal configuration. Cutting elements 31 are associated with carrier 21 in such a way that they sit with their narrow sides on a contact surface of carrier 21. The rear side of cutting elements 31 is braced with respect to a supporting surface of carrier 21. A solder join can be provided in the region of the rear sides and the contact surface. The use of another intermaterial join, for example an adhesive join, is also conceivable.

That side of cutting elements 31 which is located oppositely from the contact surface forms a cutting surface 32.1. The free-standing edge of that cutting surface 32.1 forms a respective partial edge. The partial edge correspondingly constitutes a transition between cutting surface 32.1 and an exposed surface 32.2 adjacent thereto in a cutting direction. A continuous cutting edge 32 is thereby produced in cutting region 30. As is evident from the drawings, two cutting edges 32 are correspondingly provided in the two cutting regions 30 on oppositely located sides of carrier 21.

Between the two rows of cutting elements 31, the upper side of carrier 21 is occupied by armor elements 35. Armor elements 35 can also be made of hard material, for example metal carbide or ceramic. They are intermaterially joined, for example adhesively bonded or soldered, to the upper side of carrier 21. Armor elements 35 are preferably set against one another with zero clearance at their longitudinal-side ends 35.1. The abutment faces between armor elements 35 are thereby also protected from erosion.

It is further evident from FIGS. 3 and 4 that infeed elements 34 are provided at the longitudinal-side end of the two rows of cutting elements 31. Like cutting element 31, infeed elements 34 are made of a hard material, in particular metal carbide or ceramic material. Infeed elements 34 are sintered components that can be produced separately in a previous method step and can then be joined, for example adhesively bonded or soldered, to shear bar 20.

The conformation of infeed elements 34 is shown in more detail in FIGS. 8 to 11.

As these drawings show, infeed elements 34 can comprise an edge portion 34.1; that edge portion 34.1 then transitions preferably into cutting edge 32 of cutting element 31. Particularly preferably, that edge portion 34.1 is in alignment with cutting edge 32.

Infeed element 34 furthermore comprises an infeed bevel 34.6. Infeed bevel 34.6 can be embodied as a flat surface or as a concave surface. Further, different geometries, for example convex infeed bevels, or combinations of the aforesaid geometries, are also conceivable. Particularly preferably, however, flat or concave infeed bevels 34.6 are used.

Infeed element 34 possesses a front-side exposed infeed-element surface 34.5 that transitions, preferably steplessly, into exposed surface 32.2 of the adjacent cutting element 31, as shown in FIGS. 3 and 4.

Infeed element 34 is terminated on the upper side by a cover portion 34.12. This cover portion 34.12 transitions, preferably steplessly, into cutting surface 32.1 of the adjacent cutting element 31.

Edge portion 34.1 of infeed element 34 can form, locally, a transition between cover portion 34.12 and exposed infeed-element surface 34.5.

Figure 8:
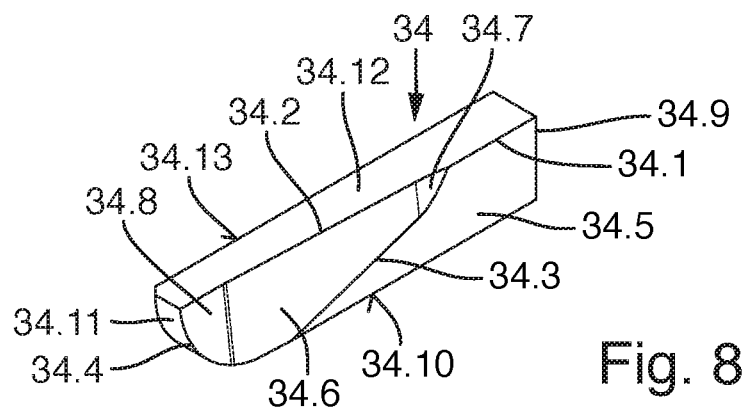
FIGS. 8 to 11 are various depictions of an infeed element for the shear bar according to FIGS. 5 to 7.
Figure 9:
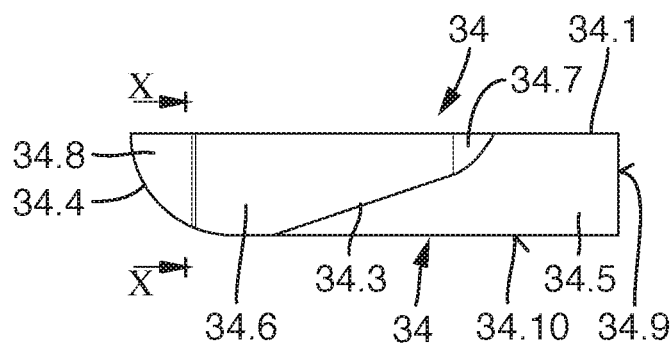
Figure 10:
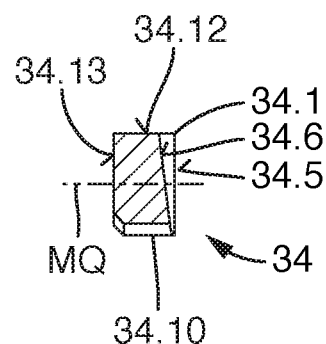
Figure 11:
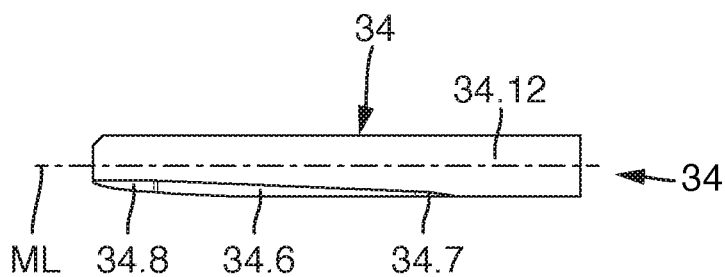

As is evident in particular from FIG. 8, infeed element 34 has an infeed bevel 34.6. This infeed bevel 34.6 is delimited on oppositely located sides by an edge 34.2 and by a transition portion 34.3. Edge 34.2 constitutes a transition between infeed bevel 34.6 and cover portion 34.12. Transition portion 34.3 constitutes a transition between infeed bevel 34.6 and exposed infeed-element surface 34.5.

Infeed bevel 34.6 is arranged both at an angle to exposed infeed-element surface 34.5 and at an angle to cover portion 34.12. This is evident in particular from FIGS. 10 and 11. It is apparent from these drawings that infeed bevel 34.6 is arranged with a tilt both with respect to longitudinal center plane ML that proceeds in a longitudinal direction of infeed element 34 (see FIG. 11) and with respect to transverse center plane MQ that also proceeds in a longitudinal direction (see FIG. 10). As a result of this tilted arrangement, infeed bevel 34.6 is tilted in such a way that is arranged with a setback with respect to cutting edge 32.

Exposed infeed-element surface 34.5 possesses a flat abutment face 34.9 on its side facing toward the adjoining cutting element 31. With this abutment face 34.9, infeed element 34 can be set with zero clearance alongside the adjoining cutting element 31.

Infeed bevel 34.6 comprises carryover regions 34.7, 34.8 on its two longitudinal-side ends. The conformation of these carryover regions 34.7, 34.8 is evident from FIG. 11. As shown by that illustration, carryover regions 34.7, 34.8 can be embodied as flat surfaces that adjoin infeed bevel 34.6 at an angle. It is also conceivable to provide a curved conformation on carryover regions 34.7, 34.8. A harmonious transition to the adjacent regions of infeed element 34 can thereby be created. In the present exemplifying embodiment, carryover region 34.7 that faces toward abutment face 34.9 is embodied as a concave surface. Second carryover region 34.8 is embodied in the form of a flat surface that adjoins the surface-shaped infeed bevel 34.6 at an angle.

Oppositely from cover portion 34.12, infeed element 34 possesses a bottom 34.10, and at the rear it has a rear wall 34.13. Infeed element 34 is braced against carrier 21, with the intermediary of an intermaterial join, at bottom 34.10 and at rear wall 34.13. The intermaterial join has a lower modulus of elasticity than infeed element 34. The intermaterial join thereby constitutes a buffer layer with which impact loads can be absorbed within certain limits. The intermediary intermaterial join furthermore serves to brace infeed element 34 in planar fashion in the region of bottom 34.10 and rear wall 34.13, so that the risk of breakage of the infeed element is considerably reduced.

At the exposed end located oppositely from abutment face 34.9, infeed element 34 can also be equipped with an abutment region 34.11. In the present exemplifying embodiment, abutment region 34.11 is constituted as a convex wall portion. At this wall portion, infeed element 34 can again be intermaterially joined to carrier 21.

As has been explained above, infeed element 34 is preferably made of metal carbide. According to the present invention it is embodied in such a way that infeed bevel 34.6 has already been profiled on in the sintering process. A laborious process of grinding the hard material is thereby eliminated. Correspondingly, upon production of infeed element 34, firstly a green compact having infeed bevel 34.6 pressed on is produced, and it is then fired in the sintering oven to produce the finished metal-carbide component in response to temperature.

FIGS. 12 to 15 show an alternative variant embodiment of an infeed element 34. This infeed element 34 is configured substantially similarly to infeed element 34 according to FIGS. 8 to 11, and the statements made above can therefore be referred to in order to avoid repetition. As is evident from these illustrations, infeed element 34 differs in that abutment region 34.11 is not convexly curved but instead is embodied rectilinearly. In particular, it can be the case that abutment region 34.11 is parallel to the wall that forms abutment face 34.9.

A further difference is the fact that infeed bevel 34.6 comprises only carryover region 34.8. The infeed bevel does not possess a carryover region on the other side. It is instead the case here that infeed bevel 34.6 extends considerably farther in a longitudinal direction, so that edge portion 34.1 is shorter than in the exemplifying embodiment according to FIGS. 8 to 11.

Figure 16:
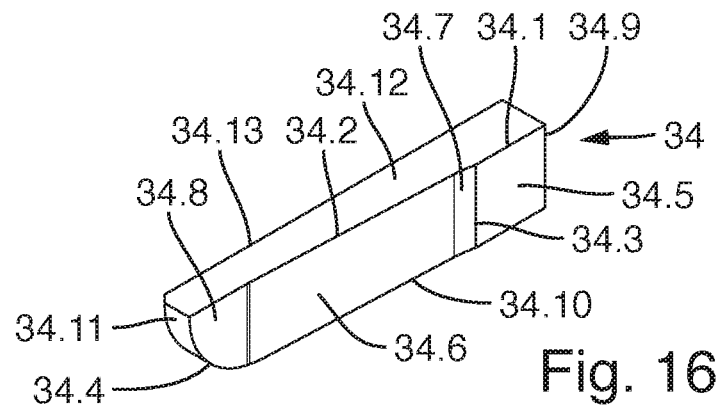
FIG. 16 a third exemplifying embodiment of an infeed element for the shear bar according to FIGS. 5 to 7.
Figure 17:
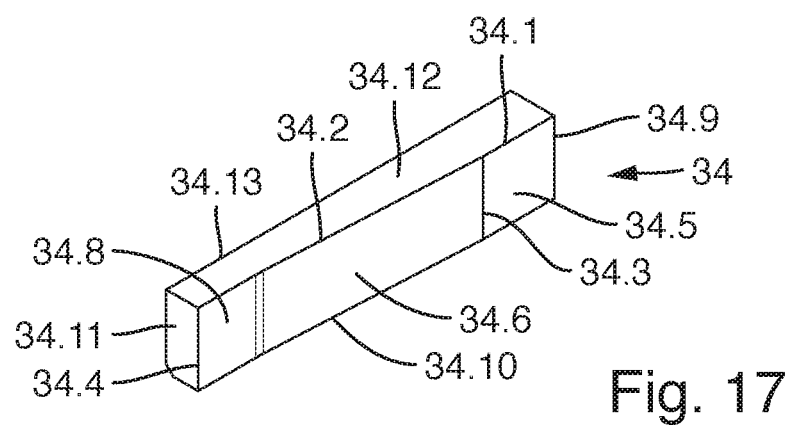
FIG. 17 a fourth exemplifying embodiment of an infeed element for the shear bar according to FIGS. 5 to 7.

FIGS. 16 and 17 show further alternatives for infeed element 34. With respect to these exemplifying embodiments as well, reference will be made substantially to the statements made above, and only the differences will be discussed below.

In the variant according to FIG. 16, infeed bevel 34.6 is embodied so that it is at an angle only to longitudinal center plane ML. An incidence angle with respect to transverse center plan MQ does not exist here. Infeed bevel 34.6 is accordingly also tilted only in one plane. The result is to produce a perpendicularly proceeding transition portion 34.3. In contrast thereto, obliquely proceeding transition portions 34.3 are provided in the case of infeed elements 34.6 described earlier.

Figure 12:
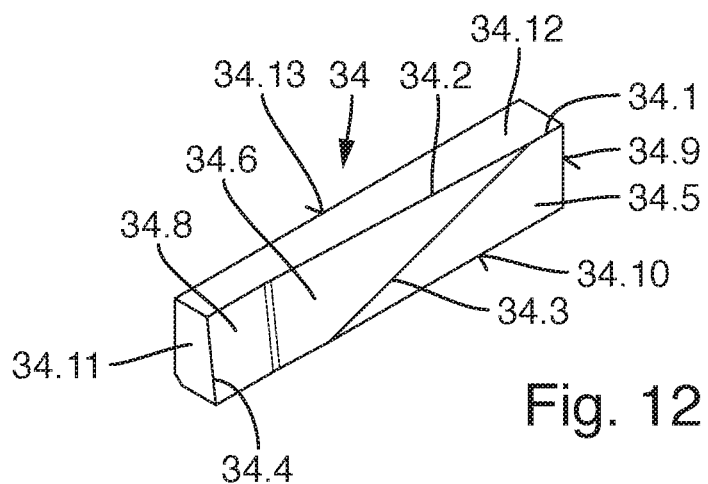
FIGS. 12 to 15 are various depictions of a second exemplifying embodiment of an infeed element for the shear bar according to FIGS. 5 to 7.
Figure 13:
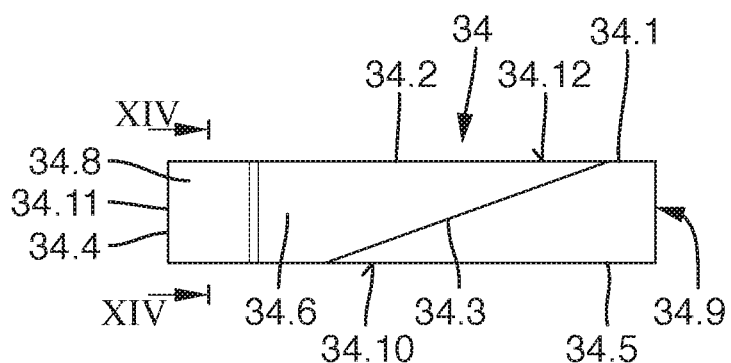
Figure 14:
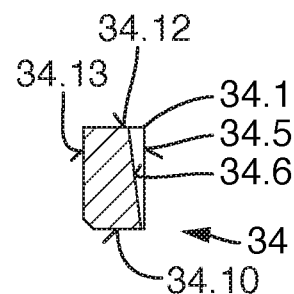
Figure 15:
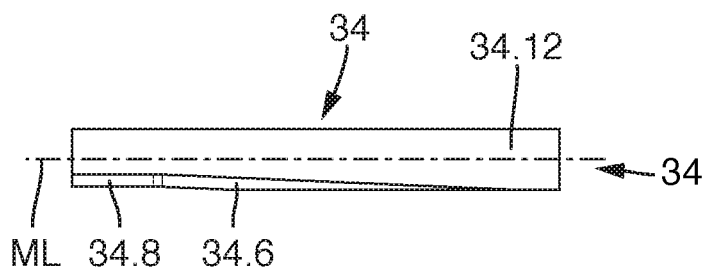

Two carryover regions 34.7, 34.8 are again provided on infeed element 34 according to FIG. 16. Infeed element 34 according to FIG. 17, conversely, comprises only one carryover region 34.8. In addition, with infeed element 34 according to FIG. 16, similarly to FIG. 8, a convex abutment region 34.11 is provided, whereas the variant according to FIG. 17, like FIG. 12, provides for a planar abutment region 34.12.

FIGS. 19 to 21 describe a further embodiment of a shear bar 20. This shear bar 20 has, in principle, the same overall configuration as shear bar 20 according to FIGS. 5 to 7. Only the differences will therefore be discussed. With this shear bar 20 according to FIGS. 18 to 21 as well, a carrier 21 having end pieces 22 and fastening receptacles 23 is once again provided. Two cutting regions 30, made up of cutting elements 31 set alongside one another, are once again formed.

On shear bar 20 according to FIGS. 5 to 7, infeed elements 34 are provided on each of the longitudinal-side ends of cutting edges 32. This is also the case with shear bar 20 according to FIGS. 18 to 21. In addition, however, the shear bar according to FIGS. 18 to 21 also comprises infeed elements 34 that are introduced into the rows of cutting elements 31. Two additional infeed elements 34 are provided for each cutting edge 32.

Reference is made to FIGS. 22 to 25 for a description of these introduced infeed elements 34. As these illustrations show, infeed elements 34 comprise edge portions 34.1 on oppositely located sides. Edge portions 34.1 constitute a transition between a front-side exposed infeed-element surface 34.5 and a cover portion 34.12.

Infeed bevels 34.6 are provided adjacently to the two edge portions 34.1. Infeed bevels 34.6 are delimited on oppositely located sides by an edge 34.2 and by a transition portion 34.3. In that respect, the configuration of infeed element 34 corresponds to the previously described conformation of infeed elements 34, and all the variants that have been described above can also be implemented with reference to infeed element 34 according to FIGS. 22 to 25.

Figure 22:
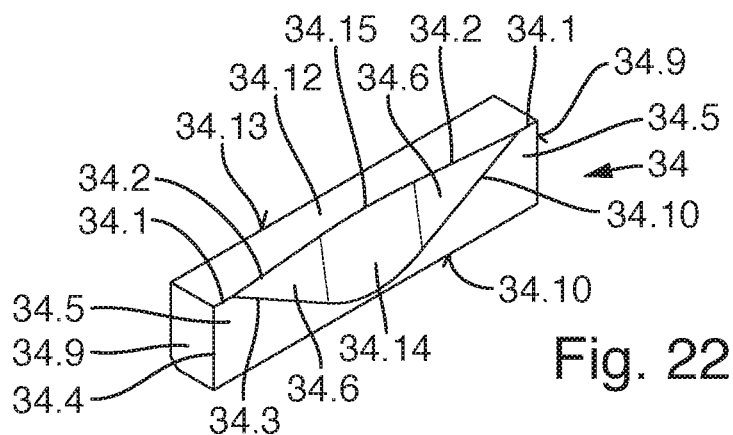
FIGS. 22 to 25 are various depictions of an infeed element for the shear bar according to FIGS. 18 to 21.
Figure 23:
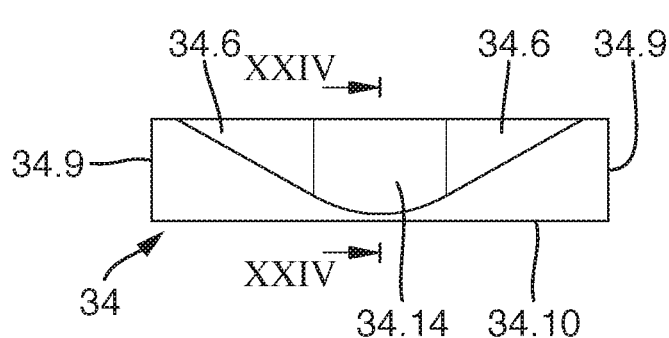
Figure 24:
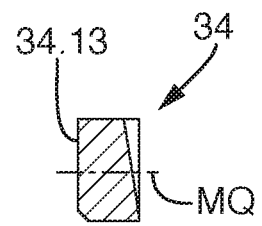
Figure 26:
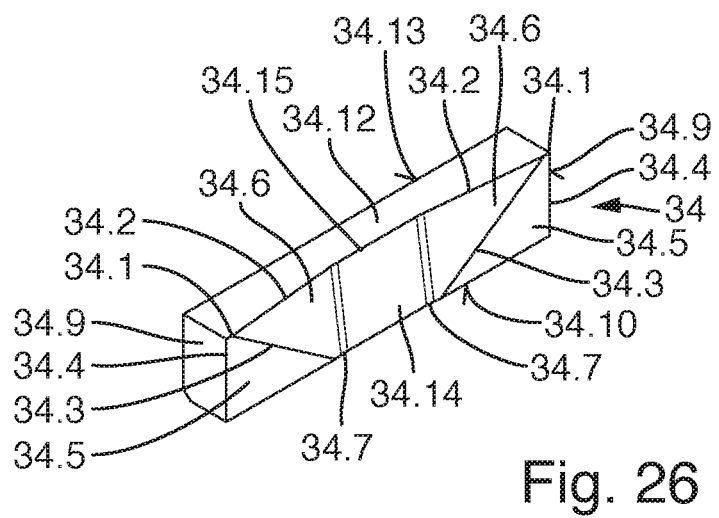
FIG. 26 is a perspective depiction of a second variant of an infeed element for the shear bar according to FIG. 18.

In contrast to the exemplifying embodiments previously described, the infeed element possesses two infeed bevels 34.6 that are arranged with a tilt with respect to one another. Infeed bevels 34.6 are joined to one another via a joining portion 34.14. As shown in FIG. 22, joining portion 34.14 can be embodied as a concave curve. Also conceivable, however, is a planar flat configuration of joining portion 34.14 as shown in FIG. 26. The two infeed bevels 34.6 can also, as has been described above, be equipped with one or two carryover regions 34.7, 34.8 at the longitudinal-side ends.

As FIG. 18 illustrates, these infeed elements 34 are integrated into the row of cutting elements 31 in such a way that a cutting element 31 is respectively directly adjacent on both sides. Edge portions 34.1 then both transition into the adjacent cutting edge 32. Exposed infeed-element surface 34.5 and cover portion 34.12 can each steplessly transition respectively into the adjoining exposed surfaces 32.2 and into the adjacent cutting surfaces 32.1 of the adjacent cutting elements 31.

Shear bars 20 having a design in accordance with FIGS. 19 to 21 can be utilized with chopping drums 10 in which, in addition to the lateral rows of knife bars 13 as shown in FIGS. 1 and 2, further circumferential rows of knife bars are also provided between those two knife bars 13. These knife bars 13 are then also arranged with a tilt (angle α).

Figure 25:
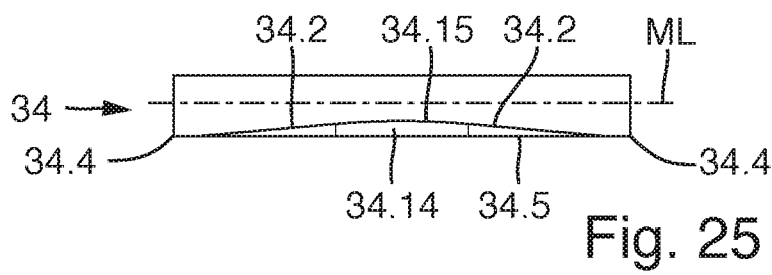

On infeed element 34 according to FIG. 26, in contrast to the infeed element according to FIG. 25, a respective carryover region 34.7 is arranged in the transition region between joining portion 34.14 and infeed bevels 34.6.

Figure 27:
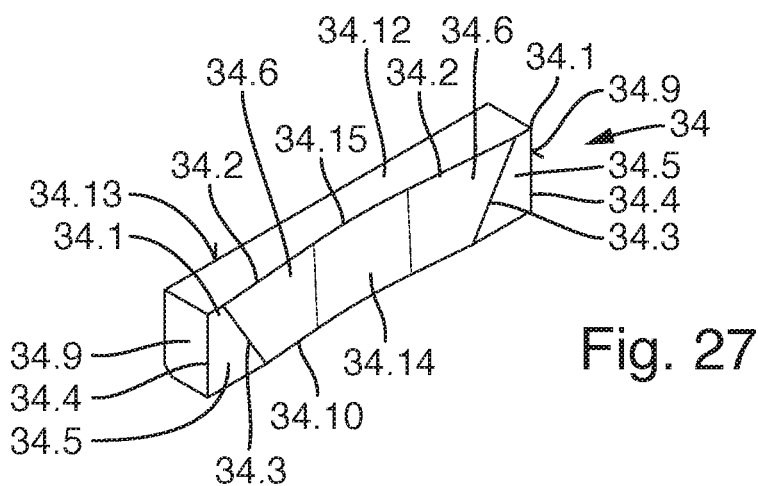
FIG. 27 is a perspective depiction of a third variant of an infeed element for the shear bar according to FIG. 18.

Infeed element 34 according to FIG. 27, unlike infeed element 34 according to FIG. 26, does not have a carryover region 34.7, 34.8. In addition, the configuration of infeed bevel 34.6 is modified: infeed bevel 34.6 extends over a larger region of exposed infeed-element surface 34.5 and is correspondingly set more steeply with respect to transition portion 34.6.

Figure 28:
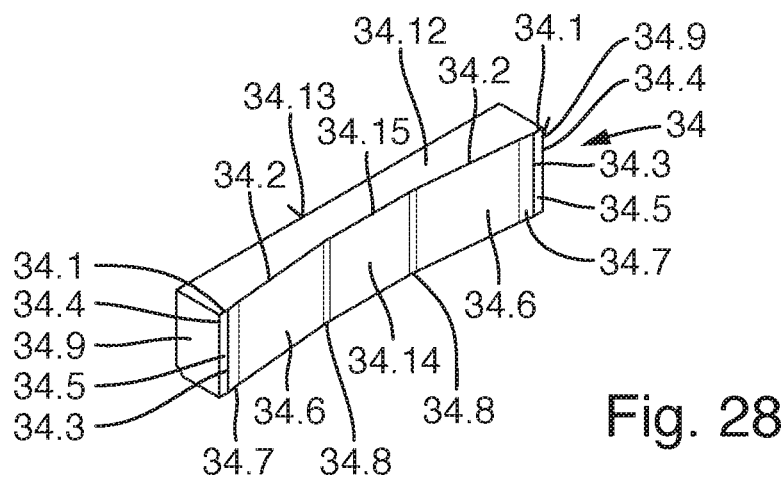
FIG. 28 is a perspective depiction of a fourth variant of an infeed element for the shear bar according to FIG. 18.

Two carryover regions 34.7, 34.8 are provided on infeed element 34 according to FIG. 28. Infeed bevels 34.6 are each arranged with a tilt only in the direction of longitudinal center plane ML and not in the direction of transverse center plane MQ.

The invention claimed is:

1. A shear bar for a material shredder, comprising:
a carrier including a cutting region;
a plurality of cutting elements set alongside one another in a row extending in a longitudinal direction in the cutting region, each of the cutting elements including a partial edge, each of the partial edges being defined as a transition between a cutting surface of the cutting element extending transversely to a cutting direction and an exposed surface of the cutting element extending in the cutting direction, at least some of the partial edges of the cutting elements forming a cutting edge of the shear bar configured for cutting engagement with a material to be shredded; and
an infeed element provided in the row of cutting elements as a longitudinal extension of the row of cutting elements, the infeed element being a sintered part including an infeed bevel profiled on the infeed element in a sintering process, the infeed bevel extending indirectly or directly to the cutting edge, the infeed bevel being arranged at a tilt with respect to the cutting edge such that the infeed bevel is arranged with a setback with respect to the exposed surfaces and toward the cutting surfaces of the cutting elements;
wherein the infeed element includes a longitudinal center plane extending parallel to the cutting edge, and the infeed element includes a transverse center plane extending perpendicular to the longitudinal center plane and parallel to the cutting edge; and
wherein the infeed bevel faces away from the carrier and is at an acute angle both to the longitudinal center plane and to the transverse center plane.

2. The shear bar of claim 1, wherein:
the infeed element includes an infeed-element cutting edge aligned with the cutting edge of the shear bar.

3. The shear bar of claim 1, wherein:
the infeed element includes an upper-side cover portion transitioning flush into the cutting surface of an adjacent one of the cutting elements.

4. The shear bar of claim 3, wherein:
the infeed element includes a front-side exposed infeed-element surface transitioning flush into the exposed surface of the adjacent one of the cutting elements.

5. The shear bar of claim 4, wherein:
the infeed bevel of the infeed element is delimited on oppositely located sides by an edge and by a transition region, the edge transitioning into the upper-side cover portion and the transition region transitioning into the front-side exposed infeed-element surface.

6. The shear bar of claim 5, wherein:
the infeed bevel includes a surface-shaped portion extending in a direction of the cutting edge of the shear bar, the surface-shaped portion terminating at one longitudinal-side end in a first carryover region terminating in at least one of the upper-side cover portion and the front-side exposed infeed-element surface, the first carryover region adjoining the surface-shaped portion at an angle between flat surfaces or in a curved shape.

7. The shear bar of claim 6, wherein:
the infeed element includes an abutment face at one longitudinal-side end adjacent the adjacent cutting element, and an end portion at an oppositely located longitudinal-side end; and
the infeed element includes a second carryover region in a region of the end portion, the second carryover region adjoining the infeed bevel at an angle between flat surfaces or in a curved shape.

8. The shear bar of claim 4, wherein:
the infeed element is delimited on its upper side by the upper-side cover portion and on its lower side by a bottom parallel to the upper-side cover portion; and
the infeed element is delimited at its front by the front-side exposed infeed-element surface, and the front-side exposed infeed-element surface adjoins at least one of the upper-side cover portion and the bottom.

9. The shear bar of claim 1, wherein:
the infeed element is a first infeed element provided at one longitudinal-side end of the row of cutting elements.

10. The shear bar of claim 9, further comprising:
a second infeed element provided at an opposite longitudinal-side end of the row of cutting elements from the first infeed element.

11. The shear bar of claim 1, wherein:
the infeed element is integrated into the row of cutting elements between two adjacent cutting elements.

12. The shear bar of claim 11, wherein:
the infeed bevel is a first infeed bevel; and
the infeed element includes a second infeed bevel at an angle to the first infeed bevel, and the infeed bevels transition into one another directly or via a joining portion.

13. The shear bar of claim 11, wherein:
the infeed bevel is a first infeed bevel; and
the infeed element is delimited on its upper side by an upper-side cover portion;
the infeed element includes a second infeed bevel at an angle to the first infeed bevel, and the infeed bevels transition into one another via a joining portion; and
the joining portion terminates with a joining edge forming a transition between the joining portion and the upper-side cover portion.

14. The shear bar of claim 13, wherein:
the joining portion includes a flat surface or a concavely curved surface between the two infeed bevels.

15. The shear bar of claim 1, wherein:
the row of cutting elements is a first row of cutting elements; and
the carrier includes a second row of cutting elements on an opposite side of the carrier from the first row of cutting elements, the second row of cutting elements forming a second cutting edge and including at least one infeed element.

16. The shear bar of claim 1, further comprising:
a row of armor elements located on an upper side of the carrier and adjoining the row of cutting elements, the armor elements being plate-shaped elements made of metal carbide.

17. A shear bar for a material shredder, comprising:
a carrier including a cutting region;
a plurality of cutting elements set alongside one another in a row extending in a longitudinal direction in the cutting region, each of the cutting elements including a partial edge, each of the partial edges being defined as a transition between a cutting surface of the cutting element extending transversely to a cutting direction and an exposed surface of the cutting element extending in the cutting direction, at least some of the partial edges of the cutting elements forming a cutting edge of the shear bar configured for cutting engagement with a material to be shredded; and
an infeed element provided in the row of cutting elements as a longitudinal extension of the row of cutting elements, the infeed element being a sintered part including an infeed bevel profiled on the infeed element in a sintering process, the infeed bevel extending indirectly or directly to the cutting edge, the infeed bevel being arranged at a tilt with respect to the cutting edge such that the infeed bevel is arranged with a setback with respect to the exposed surfaces and toward the cutting surfaces of the cutting elements;
wherein the infeed element includes a longitudinal center plane extending parallel to the cutting edge, and the infeed element includes a transverse center plane extending perpendicular to the longitudinal center plane and parallel to the cutting edge; and
wherein the infeed bevel faces away from the carrier and is at an acute angle to the longitudinal center plane and is perpendicular to the transverse center plane.

* * * * *